(12) United States Patent
Mayberry et al.

(10) Patent No.: US 10,401,225 B2
(45) Date of Patent: Sep. 3, 2019

(54) METHOD OF CALIBRATING A CONTACT IMAGE SENSOR SCAN BAR IN A DOCUMENT SCANNER

(71) Applicant: LEXMARK INTERNATIONAL, INC., Lexington, KY (US)

(72) Inventors: Mark Lane Mayberry, Wilmore, KY (US); Karl Mark Thompson, Midway, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/722,017

(22) Filed: Oct. 2, 2017

(65) Prior Publication Data

US 2019/0101446 A1    Apr. 4, 2019

(51) Int. Cl.
| | |
|---|---|
| *G01J 3/02* | (2006.01) |
| *G01J 3/52* | (2006.01) |
| *G01J 3/50* | (2006.01) |
| *H04N 1/48* | (2006.01) |

(52) U.S. Cl.
CPC .............. *G01J 3/501* (2013.01); *G01J 3/027* (2013.01); *G01J 3/524* (2013.01); *H04N 1/484* (2013.01)

(58) Field of Classification Search
CPC ............. H04N 1/484; H04N 1/486; H04N 2201/04786; H04N 1/407; H04N 2201/04793; H04N 9/11; H04N 1/193; H04N 1/40; H04N 1/401; H04N 2201/0081; H04N 13/302; H04N 13/324; H04N 1/00806; H04N 1/02815; H04N 1/0408; H04N 1/0473; H04N 1/40056; H04N 1/4095; H04N 1/4097; H04N 1/58; H04N 5/253; H04N 13/00; H04N 1/00249; H04N 1/00257; H04N 1/00795; H04N 1/02845; H04N 1/02865; H04N 1/04; H04N 1/12; H04N 1/40037; H04N 1/48; H04N 1/482; H04N 1/504; H04N 1/6027; H04N 1/622; H04N 3/10; H04N 5/202; H04N 9/045; H04N 9/07; H04N 9/077; H04N 9/093; H04N 9/44
USPC .......................... 358/475, 509, 482, 483, 484
See application file for complete search history.

(56) References Cited

U.S. PATENT DOCUMENTS

| | | | |
|---|---|---|---|
| 5,729,361 A | 3/1998 | Suggs | |
| 5,916,309 A * | 6/1999 | Brown | G06F 5/065 348/116 |
| 2004/0257600 A1 * | 12/2004 | Hiromatsu | H04N 1/58 358/1.9 |
| 2008/0285096 A1 * | 11/2008 | Cui | H04N 1/00005 358/496 |
| 2009/0086293 A1 * | 4/2009 | Sakakibara | H04N 1/40 358/509 |
| 2009/0153698 A1 * | 6/2009 | Cui | H04N 1/40056 348/229.1 |
| 2010/0073739 A1 * | 3/2010 | Sekiguchi | H04N 1/40 358/474 |
| 2011/0149358 A1 * | 6/2011 | Cheng | H04N 1/0473 358/509 |
| 2012/0033274 A1 * | 2/2012 | Janssen | H04N 1/48 358/505 |

(Continued)

*Primary Examiner* — Negussie Worku

(57) ABSTRACT

A method of calibrating a document scanner contact image sensor scan bar having an LED array to increase LED sensor array output and/or reduce total color scan line cycle time.

8 Claims, 8 Drawing Sheets

(56) References Cited

U.S. PATENT DOCUMENTS

2016/0014302 A1* 1/2016 Oosaki ................. H04N 1/4095
                                                        358/509
2017/0280014 A1* 9/2017 Okada ................... H04N 1/401
2018/0027142 A1* 1/2018 Tang .................. H04N 1/02845
                                                        358/475

* cited by examiner

METHOD OF CALIBRATING A CONTACT IMAGE SENSOR SCAN BAR IN A DOCUMENT SCANNER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scanners and scanning methods, and more particularly to a method to maximize sensor array response for contact image scan bar in a scanner.

2. Description of the Related Art

Typical contact image sensor (CIS) scan bars contain a single, unfiltered sensor array. This is to minimize cost and size. Historically, these scan bars have been controlled by an ASIC on the controller board with a low cost analog to digital converter, also termed an analog front end (AFE), to convert the sensor output to digital data. Color content in the original being scanned has been gleaned by flashing different colored LEDs as an illumination source and measuring the sensor array output. It is typically the case that three different color LEDs—red, green and blue—are used.

A typical prior art CIS scan bar system timing diagram and usage map are shown in FIGS. 1-4, respectively. CIS scan bar system 10 has a controller 12 comprised of an ASIC 14, and memory 20 having a plurality of data buffers 22 for storing scan line data received from a CIS scan bar assembly 30. Three data buffers DB1, DB2, DB3, are shown for storing red, green and blue scan line data received from CIS scan bar assembly 30. As is known, controller 12 includes firmware 13 that controls its operation and interfaces with ASIC 14 and memory 20. Similarly, ASIC 14 may contain firmware 15 used for its operation. CIS scan bar 30 includes an analog front end (AFE) 32, a timing generator 40 for controlling LED array 42 having red, green and blue LEDs 42-1, 42-2, 42-3, respectively, a light guide 48, and a sensor array 50 (see FIG. 3). APE 32 includes an analog-to-digital converter (ADC) 34, a parallel to serial signal converter 36, and a timing register 38. Sensor array 50 is formed by a plurality of photoreceptors PR1-PRN as in known in the art. Light guide 48 conducts the light from each of the three LEDs to illuminate the plurality of photoreceptors PR1-PRN in sensor array 50 which provide a plurality of analog output voltage signals S7-1-S7-N. The number of photoreceptors N depends on the scanning resolution and overall length of the CIS scan bar 30. For a scanning resolution of 1200 pixels per inch (ppi) and a nine inch (2:29 mm) scan bar length, there would be 1:200 photoreceptors and 1200 output voltage signals per inch or about 10800 output voltage signals—one for each pixel. An A4 CIS scan bar has 12 CIS chips per bar while an A3 CIS bar has 18 CIS chips per bar. For the A4, 1200 ppi scan bar, there are 10368 photoreceptors (864 photoreceptors per chip). For an A4, 600 ppi scan bar, there are 5184 photoreceptors (423 photoreceptors per chip). Example values for N may be 10800, 10368, and 5184.

Typically during each color scan line cycle (CSLC), ASIC 14 provides a line synch signal S1 to APE 32 of CIS scan bar 30 which is passed as line synch signal S2 to timing generator 40 which uses signals S4, S5, S6 to sequentially turn on and off red, green and blue LEDs 42-1, 42-2, 42-3, respectively, that illuminate sensor array 50. Signals S4-S6 are also designated as R_on, G_on and B_on, respectively. Signal S1 is also designated as XLS and signal S2 as LS. A frame synch (FS) signal S3 is provided by timing generator 40 to sensor array 50 and is used to synchronize the sending of the output voltage signals S6-1-S6-N to parallel to serial converter 36 with the illumination of sensor array 50 by one of the LEDs. Timing information for the pulses in frame synch signal S3 may be provided from the timing register 38 via communication link 39. Signal S2 may also be provided via communication link 39. Signals S1 and S2 are substantially identical and are as shown as a single trace in FIG. 2. A first color scan line cycle CSLC1 and a partial second color scan line cycle CSLC2 are shown in FIG. 2.

When illuminated by each of the three LEDs in sequence, sensor array 50 provides the plurality of parallel analog signals S6-1-S6-N back to AFE 32 that is the response of each individual photoreceptor to each light color of light. This plurality of analog signals is sent to a parallel to serial converter 36 shown as part of AFE 32 where each signal is read out in a serial fashion to ADC 34. The ADC 34 converts the received signal S7-1-S7-N to a digital form that is transmitted over communication link 19 as signal S7 (the data structure of signal S7 is shown in FIG. 11) for storing in data buffers 22 provided in memory 20 of controller 10. Signal S1 may also be transmitted over communication link 19. The digital data in signal S7 for each color of scan line—red, blue, and green—is stored in a corresponding buffer, the red scan line data in data buffer DB1, the green scan line data in data buffer DB2, and the blue scan line data in data buffer DB3. The three sets of red, green and blue scan line data comprise one color scan line cycle data set. When sensor array 50 is being illuminated by the green LED 42-2, the red scan line data is read from sensor array 50 and sent to data buffer DB1. When sensor array 50 is being illuminated by the blue LED 42-3, the green scan line data is read from sensor array 50 and sent to data buffer DB2. The blue scan line data is read from sensor array 50 and sent to data buffer DB3 when the red LED 42-1 illuminates the sensor array 50 at the start of the next color scan line. This cycle repeats for the next color scan line cycle, CSLC2 as shown in FIG. 2. ASIC 14 using its firmware then retrieves each color of scan line data—red, green, blue—in sequence for processing via communication link 29. This data is used to create a digital copy of the document being scanned, which digital copy may be printed or sent as a digital file.

In some CIS scan bar systems, AFE 32 and timing generator 40 are found in controller 12 and signals S2-S6 are sent from ASIC 14 to CIS scan bar 30 via communication link 19.

As shown in FIG. 2, a recurring synch pulse is provided at the same predetermined substantially equal time intervals, in signals S1-S3 to initiate the turn-on of each of the three LEDs 42-1, 42-2, 42-3 in series. After a first synch pulse SP11, red LED 42-1 is turned on using signal S4 for a first predetermined time period T1 passing through light guide 48 and illuminates sensor array 50 which produces analog signals S6-1-S6-N from photoreceptors PR1-PRN that is the response of sensor array 50 to red LED 42-1. A second synch pulse SP12 triggers the turn-on of green LED 42-2 via signal S5 for a second predetermined time period T2 with analog signals S6-1-S6-N now being the response of sensor array 50 to green LED 42-2. A third synch pulse SP13 triggers the turn-on of blue LED 42-3 via signal S6 for a third predetermined time period T3 with analog signals S6-1-S6-N now being the response of sensor array 50 to blue LED 42-3. The cycle repeats at a fourth synch pulse SP21 at the start of the second color scan line cycle CSLC2. The time period between the first synch pulse SP11 and synch pulse SP21 represents one color scan line cycle, designated CSLC1, comprised of the sum of the three line time segments—red scan time RST, green scan time GST and blue scan time BST. As shown, the time period between synch pulses SP11 and SP12 is designated as RST, the time period between synch pulses SP12 and SP13 as GST, and the time period between synch pulses SP13 and SP21 designated as BST are substantially the same and each represents ⅓ of the color scan line cycle CSLC. The red color scan data is collected during RST, green color scan data during GST and blue color scan data during BST. Concurrently with the synch pluses SP11, SP12, SP13, SP21 on signals S1 and S2, frame pulses FP11, FP12, FP13, FP21 are provided on signal S3 to synch the transfer of the output voltage signal data from sensor array 50 to AFE 32 and on to ASIC 14. Prior art ASIC 14 is designed such that the time period between the frame pulses is fixed for a given sensor array size.

The strength of analog signals S7-1-S7-N varies for each color of LED. This is due to the fact that the response of photoreceptors PR1-PRN in sensor array 50 is not the same for all wavelengths of light as well as the fact that each of the LEDs may not provide the same light output. To achieve good color scans, it is very advantageous to balance the response between the three colors. This is almost always accomplished by having the three LEDs 42-1, 42-2, 42-3 on for different durations as shown with signal S4-S6 in FIG. 2. For purposes of illustration red LED 42 is shown having the shortest on time, blue LED 46 the longest on time with the on time of green LED 44 being somewhere in-between. However, this varies from CIS scan bar to CIS scan bar.

Provided in FIG. 4 is a prior art usage map of the three LEDs 42-1, 42-2, 42-3. The usage map MP1 has three equal segments RST, GST, BST, previously described. The length of each segment represents the overall time allotted to each LED in the color scan line cycle CSLC. Segments RST, GST, BST have equal time lengths. Within each of the segments, there are two or more sub-segments. For segment RST, there are three sub-segments R1, R2, R3. Similarly for segment GST, there are three sub-segments G1, G2, G3 and for segment BST there are sub-segments B1, B2, B3. Sub-segments R1, G1, and B1 indicate the portions of each segment where that color LED is on during that portion of that color's scan time. Sub-segments R2, G2, B2 indicate the portions of each segment where that color LED may be on depending on the actual performance of a particular sensor array 50 in a particular scan bar 30. Sub-segments R3, G3, B3 represent time where that particular color LED is turned off and represents wasted time in each color scan line cycle CSLC. It will be appreciated that where sub-segments R2, G2, B2 are off times, these sub-segments also represent wasted scan time in each color scan line cycle. It should be noted that these sub-segments are what are typically found with a CIS scan bar and, in some cases, sub-segment B3 may have a zero value due to the longer time needed by sensor array 50 to respond to the blue light from blue LED 42-3.

The data collected for each of the three color LEDs 42-1, 42-2, 42-3 is accumulated in the respective buffers DB1, DB2, DB3 and processed by ASIC 14 to create a single line of color data for the resulting scan file.

It would be advantageous to provide variability in the timing of the frame synch signal to either shorten the time needed completing each color scan line time or to make use of the wasted time areas in FIG. 4 (where all LEDs are off) in such a way to be able to increase the signal output of sensor array 50 without changing the aggregate integration time, thus, allow for variability in the LED outputs over life resulting in better scan quality.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
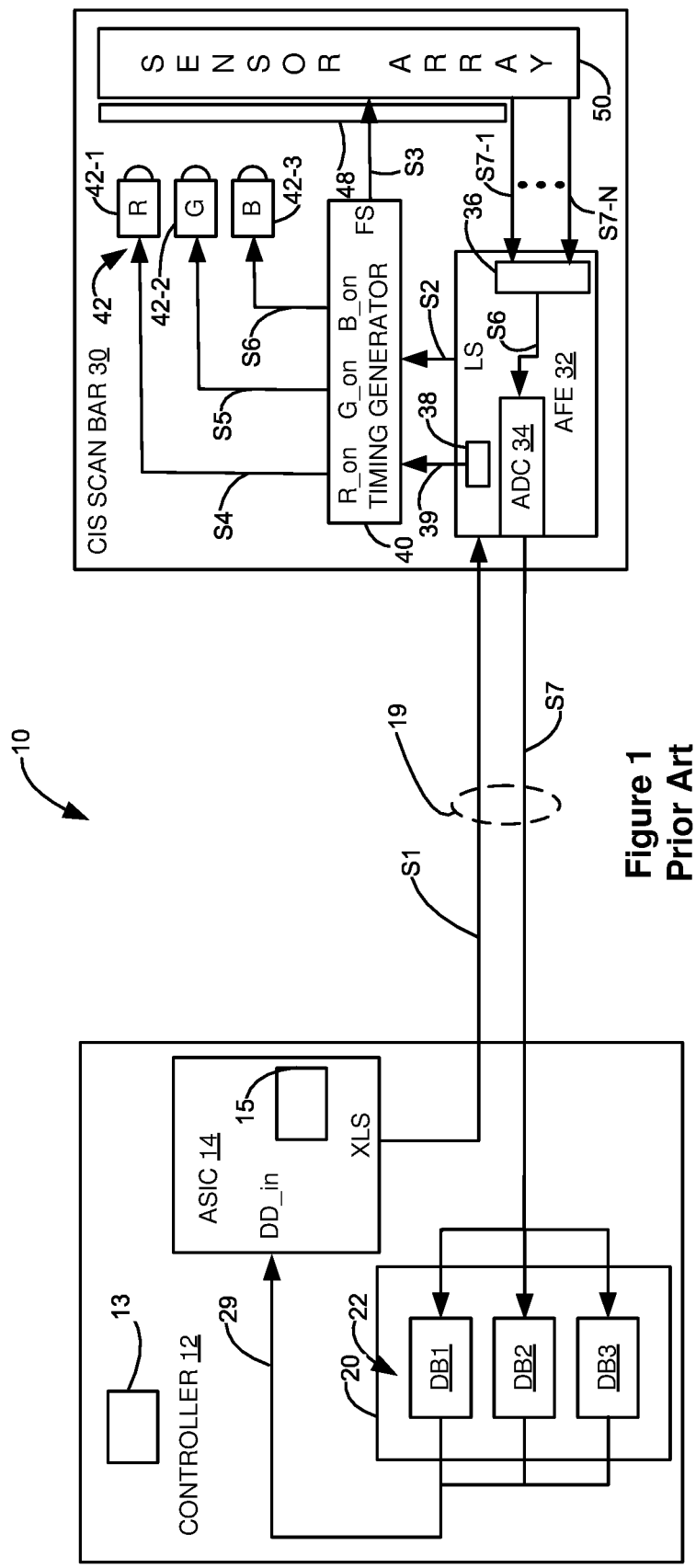
FIG. 1 is a schematic illustration of a prior art CIS scan bar system.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise. The use of "including," "comprising," or "having" and variations thereof herein is meant to encompass the items listed thereafter and equivalents thereof as well as additional items.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description. Further relative positional terms are used herein. For example, "superior" means that an element is above another element. Conversely "inferior" means that an element is below or beneath another element. The explanations of these terms along with the use of the terms "top", "bottom", "front", "rear", "left", "right", "up" and "down" are made to aid in understanding the spatial relationship of the various components and are not intended to be limiting.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

The term "image" as used herein encompasses any printed or electronic form of text, graphics, or a combination thereof. "Media" or "media sheet" refers to a material that receives a printed image or, with a document to be scanned, a material containing a printed image. The media is said to move along a media path, a media branch, and a media path extension from an upstream location to a downstream location as it moves from the media trays to the output area of the imaging system. For a top feed option tray, the top of the option tray is downstream from the bottom of the option tray. Conversely, for a bottom feed option tray, the top of the option tray is upstream from the bottom of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. As used herein, the term "media width" refers to the dimension of the media that is transverse to the direction of the media path. The term "media length" refers to the dimension of the media that is aligned to the direction of the media path. "Media process direction" describes the movement of media within the imaging system, and is generally means from an input toward an output of the imaging system. Further, relative positional terms may be used herein. For example, "superior" means that an element is above another element.

The term "image" as used herein encompasses any printed or digital form of text, graphic, or combination thereof. The term "target" refers to the media sheet having an image to be scanned. The term "button" as used herein means any component, whether a physical component or graphic user interface icon, that is engaged to initiate an action or process.

Figure 5:
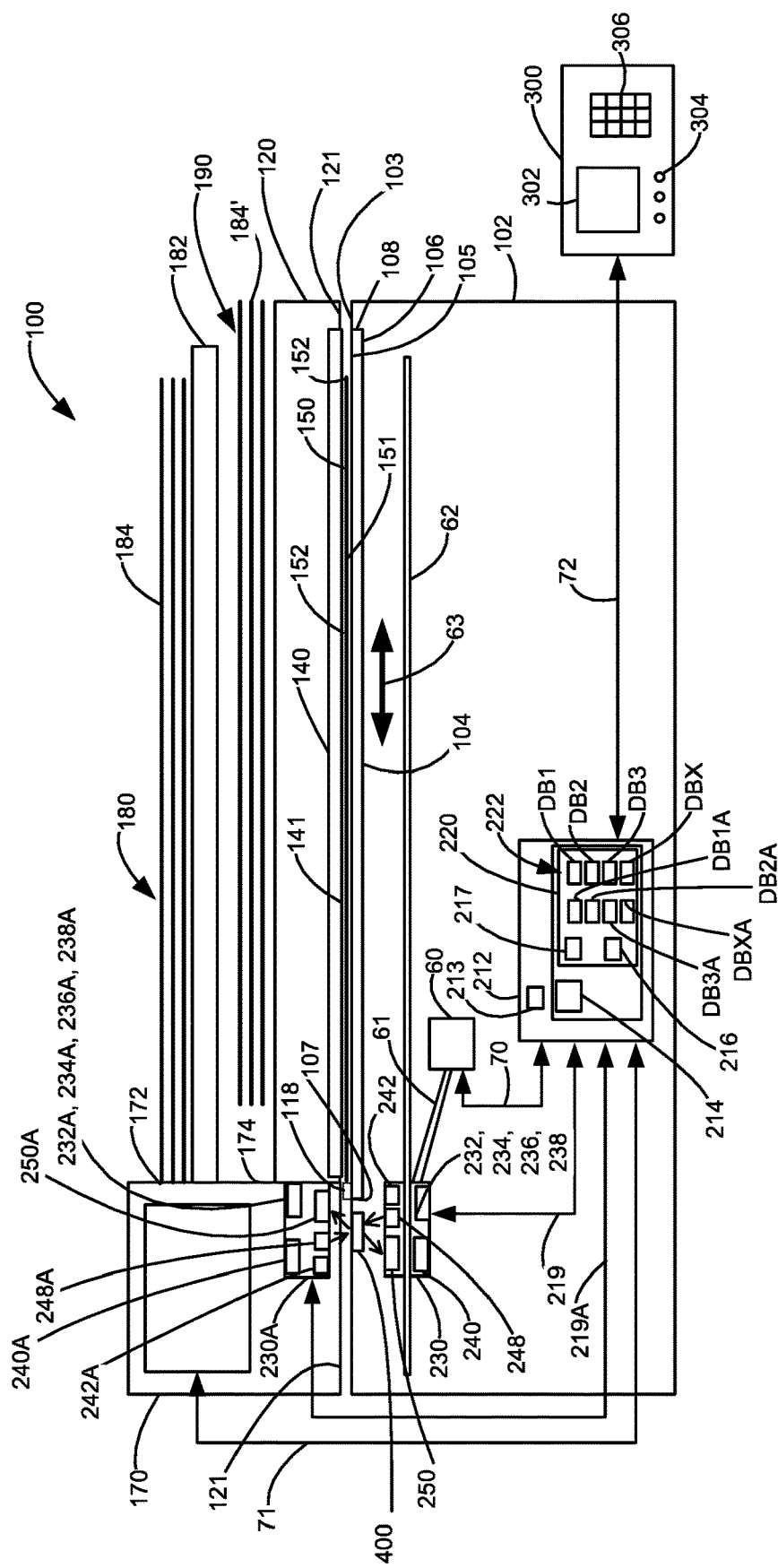
FIG. 5 illustrates a scanner configured to use the presently disclosed method.
Figure 6:
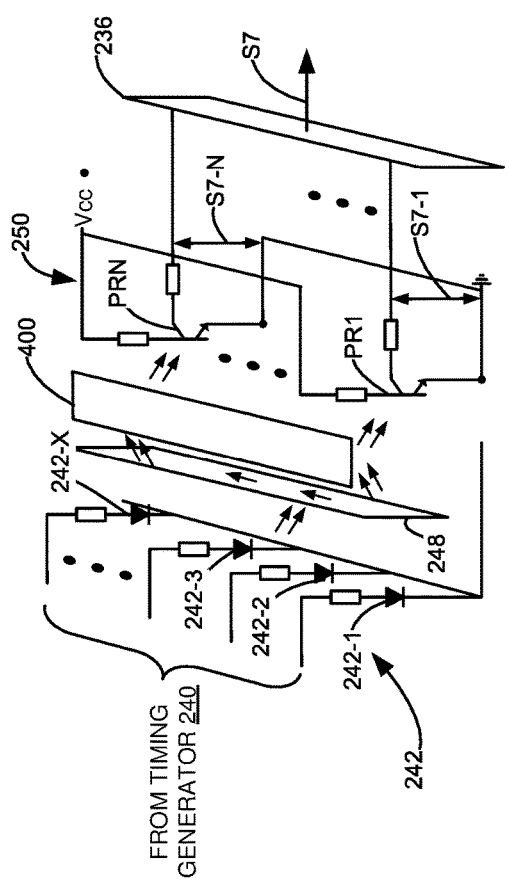
FIG. 6 is a schematic illustration of a CIS scan bar system used in the scanner of FIG. 5.
Figure 7:
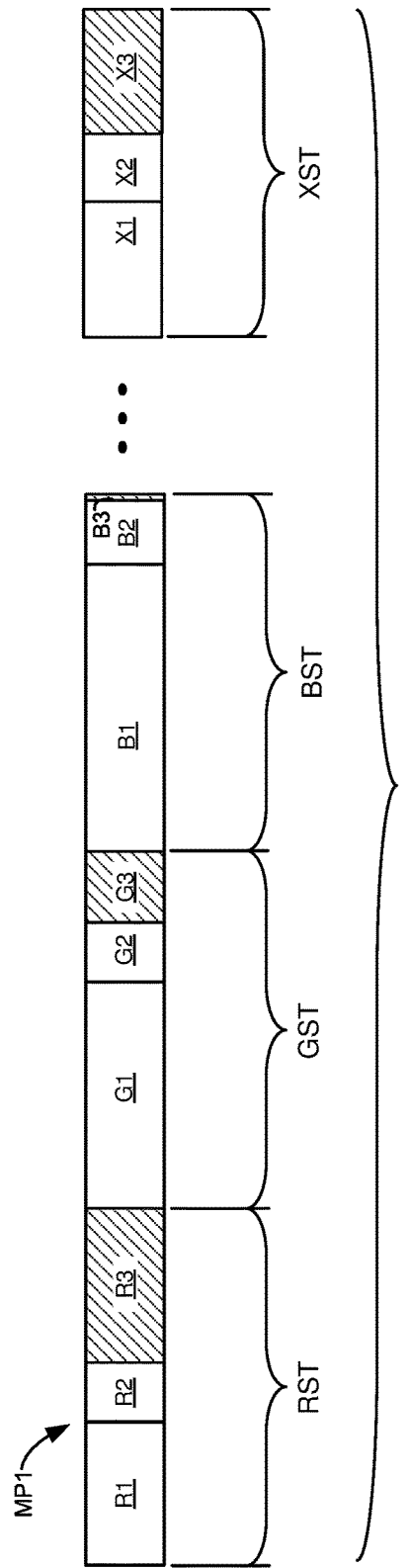
FIG. 7 is a usage map of the color LEDs of the CIS scan bar system of FIG. 5.

Referring to FIGS. 5-6, schematic illustrations of an example scanner 100 and an example embodiment of a CIS scan bar system 230 are shown. Scanner 100 may be a standalone scanner or part of a multifunction device also having printing and copying capabilities. Scanner 100 includes a base 102 having a platen 104 incorporated into an upper surface 103 thereof. A scan lid 120 is moveably attached to base 102 and moveable between an open position where scan lid 120 is raised away from platen 104 and a closed position, as shown, where scan lid 120 covers platen 104. Platen 104 is transparent having top and bottom surfaces 105, 106, and top and bottom edges 107, 108 respectively, and provides a scan area into which a target 150 is placed. The direction of scanning is typically from the top edge 107 to the bottom edge 108 of the platen 104.

As illustrated, the scan area is directed orthogonally into the plane of the page of FIG. 5, and, typically, has a slightly smaller area than that of platen 104. The scan area is sized to handle various sizes of targets to be scanned, such as A4, Letter, Legal or Ledger sized media, or smaller media such as A6, that are typically positioned lengthwise within the scan area. At one corner of the scan area on the top surface 105 of platen 104, an alignment member 118 is provided on upper surface 103, and is used to align one corner of the target 150 with of the scan area at a predetermined location. Target 150 includes a first surface 151 facing platen 104 and a second surface 152 facing scan lid 120. Alignment member 118 may be an L-shaped member extending along adjacent edges, such as top edge 107 and one of the adjacent side edges of platen 104.

Attached to an inner surface 121 of scan lid 120 is a backer 140 that provides, when the scan lid 120 is in a closed position, a background for the target 150. When scan lid 120 is in the closed position, the outer surface 141 of backer 140 presses against second surface 152 of target 150 to help provide a uniform focal length for first CIS scan bar 30. The backer 140 is usually made from compliant material, and is sized to substantially cover the scan area within the platen 104. In one form, backer 140 has a white finish on its outer surface 141. Backer 140 may also have a black or grey finish on its outer surface 145. The outer surface 145 of backer 140 serves as a background for the target 150 during the scanning. Example compliant materials for use as backer 140 include, but are not limited to, polypropylene and polyethylene terephthalate.

Within base 102 are controller 212 including ASIC 214, memory 220 with buffers 222, first CIS scan bar 230, a drive motor 60 for first CIS scan bar 230, and a drive transmission 61. Drive motor 60 is operatively coupled to drive transmission 61. When scanning the target 150 placed on platen 104, drive motor 60 and drive transmission 61 translate the first CIS scan bar 230 beneath platen 104 along the length of the scan area on a pair of spaced parallel rails 62 mounted in base 102. First CIS scan bar 230 also includes AFE 232, ADC 234, serial to parallel converter 236, timing register 238, previously described and shown for purposes of clarity in FIG. 5 as a single block, timing generator 240, LED array 242, light guide 248, and sensor array 250. Memory 220 includes a software module 216 used to configure controller 212 and interface with the firmware 213 provided in controller 212 to perform the method of the present disclosure. The arrangement of platen 104 and first CIS scan bar 230 is also referred to as a flatbed scanner.

First CIS scan bar 230 includes an LED array 242 and sensor array 250. LED array 242 has a plurality of LEDs 242-1-242-X each emitting a different color of light where 242-X represents the last color of LED in the LED array 242. For example, where LED 242-X is a third LED, then LEDs 242-1, 242-2, 242-3 may be red, green, and blue LEDs. The number and the illumining sequence of the color LEDs is a matter of design preference and not of limitation. However for the purposes of description of the presently disclosed method, X will be assumed to be equal to three and the sequence of illumining the LEDs 242-1-242-3 to illuminate the sensor array 250 will be red, green and blue. Also, the presently disclosed method is useable with an LED array having more than three colors or colors other than red, green and blue, and the use of the color red, green and blue herein is only for descriptive purposes not one of limitation. Ultraviolet or infrared LEDs may be used in LED array 242. In another example where LED 242-X is a fourth LED, then LED 242-4 may be an ultraviolet LED. In yet another example where LED 242-X is a fourth LED, then LED 242-4 may be an infrared LED. In a still further example where LEDS 242-X-1 and 242-X-2 are the fourth and fifth LEDS, then LED 2-4 may be an infrared LED and LED 2-5 may be an ultraviolet LED. The presently disclosed method would be used with each color type of LED present and used to illuminate the LED sensor array 242.

Sensor array 250 includes a plurality of photoreceptors PR1-PRN where PRN represents the last photoreceptor in the array and is a matter of design choice depending on the resolution of the chosen scan bar as later described. Sensor array 250 operates substantially the same as sensor array 50, previously described.

Figure 2:
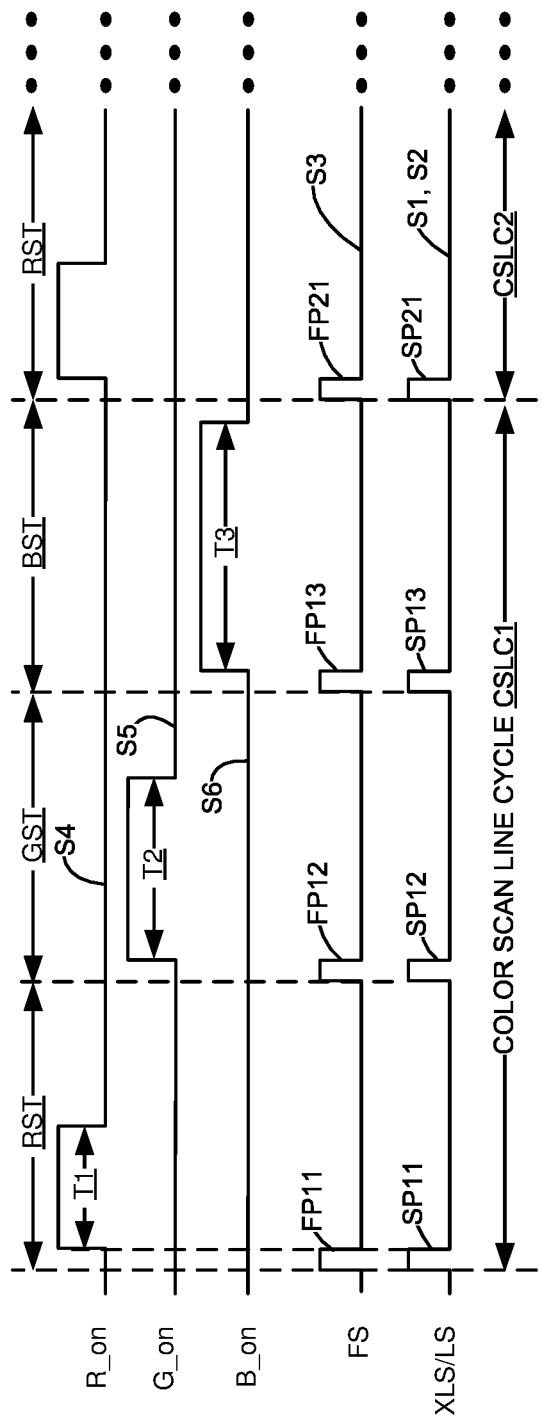
FIG. 2 is a timing diagram for the color LEDs found in the prior art CIS scan bar system of FIG. 1.
Figure 3:
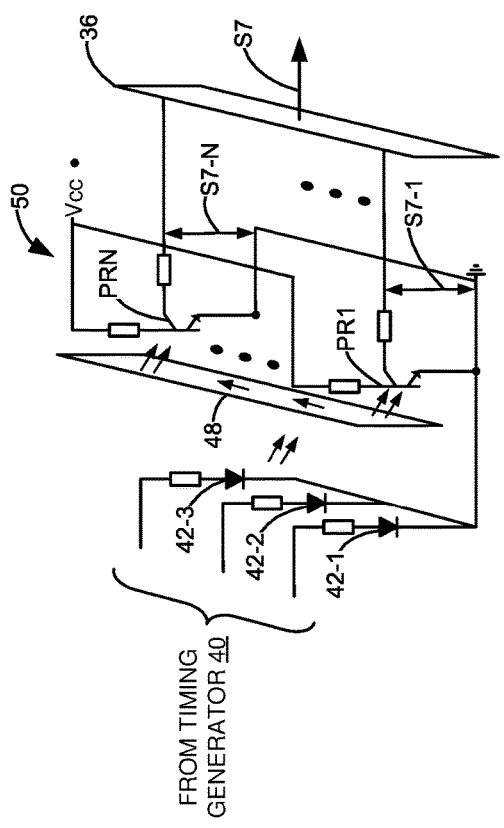
FIG. 3 is a schematic representation of the CIS scan bar used in the CIS scan bar system of FIG. 1.
Figure 4:
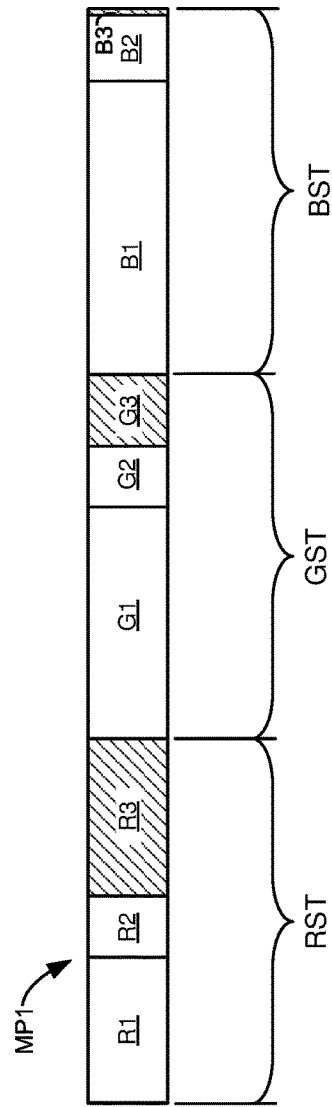
FIG. 4 is a usage map of color LEDs of the prior art CIS scan bar system of FIG. 1.

Under direction of controller 212, first CIS scan bar 230 moves, in a bi-directional scan direction indicated by arrow 63, along at least a portion of the length of platen 104. First CIS scan bar 230 under direction of controller 212 illuminates and provides successive scan lines containing image data of a first surface 151 of target 150 that is visible to first CIS scan bar 230. The image data is stored in memory 220 and buffers 222 for further processing by controller 212 and ASIC 214. Data buffers DB1, DB2, DB3, DBX may be provided in memory 220 for storing scan data respectively generated by LEDs 242-1 through 242-X of first CIS scan bar 230. Signals S1, S2 and S7, previously described with respect to FIGS. 1-2, are transmitted between first CIS scan bar 230 and controller 212 and ASIC 214 via communication link 219.

Scan lid 120 may also include an automatic document feeder (ADF) 170, an input media area 180, an output media area 190, and a second CIS scan bar 230A which is substantially the same as first CIS scan bar 230. Second CIS scan bar 230A includes AFE 232A, ADC 234A, serial to parallel converter 236A, timing register 238A, previously described and shown for purposes of clarity in FIG. 5 as a single block, timing generator 240A, LED array 242A, light guide 248A, and sensor array 250A. Color LED array 242A is substantially the same as color LED array 242 having LEDs 242A-1, 242A-2, 242A-3 through 242A-X, which are shown as a single block 242 in FIG. 5 for purposes of clarity. An input media support 182 extends from the input 172 of ADF 170 and provides input media area 180 where media 184 having images to be scanned are placed. An output media support 192 extends from the output 174 of ADF 170 and provides output media area 190 for holding the scanned media 184'. Second CIS scan bar 230A is carried by scan lid 120 and moved away from platen 104 as scan lid 120 is raised to an open position. Second CIS scan bar 230A is also referred to as an ADF scanner. Data buffers DB1A, DB2A, DB3A, DBXA may be provided in memory 220 for storing scan data respectively generated LEDs 242A-1 through 242A-X of second CIS scan bar 230A sent via communication link 219A.

A user interface 300 may be provided for scanner 100. User interface 300 comprises a display 302, such as a touch screen, a plurality of indicator lights 304, and a key pad 306. Display 302 and key pad 306 may be used to provide input to controller 12. For example, a user may select single sided or duplex scanning, or color or monochrome scanning. Display 302 and indicator lights 304 may be used to provide information about the functioning and status of scanner 100 to a user. User interface 300 is operatively coupled to controller 12 and may be mounted to base 102 or to scan lid 120.

Controller 212 may be formed, for example, as an application specific integrated circuit (ASIC), and may include a processor, such as a microprocessor. Memory 220 may be any volatile or non-volatile memory or a combination thereof such as, for example, random access memory (RAM), read only memory (ROM), flash memory and/or non-volatile RAM (NVRAM). Alternatively, memory 220 may be in the form of a separate electronic memory (e.g., RAM, ROM, and/or NVRAM), a hard drive, a CD or DVD drive, or any memory device convenient for use with controller 212. Memory 220 may be used to store program instructions such as in software module 216 for execution by controller 212 that controls operation of scanner 100. Memory 220 may also be configured to provide a look up table 217 used for storing various values or value ranges of variables used by software module 216, controller 212 and/or ASIC 214.

Controller 212 is communicatively coupled to first CIS scan bar 230 and second CIS scan bar 230A via communication links 219, 219A, respectively. Controller 212 is communicatively coupled to scan bar drive motor 60 and ADF 170 via communication links 70, 71, respectively. Controller 212 is communicatively coupled to user interface 300 via communication link 72. As used herein, the term "communication link" generally refers to a structure that facilitates electronic communication between two components, and may operate using wired or wireless technology. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Although separate communication links are shown between controller 212 and the other controlled elements, a single communication link can be used to communicatively couple the controller 212 to all of the controlled elements such as first and second CIS scan bars 230, 230A, drive motor 60, user interface 110 and ADF 170.

A calibration strip 400 is shown on upper surface 103 adjacent to the top edge 107 of platen 104. As shown calibration strip 400 is visible to be illuminated by both first and second CIS scan bars 230, 230A and in one embodiment may be used during the presently disclosed method. A second separate calibration strip may be provided for second CIS scan bar 230A within ADF 170. Calibration strip 400 is typically white in color and may be used to color balance and calibrate, according to the present method, each of the first and second CIS scan bars 230, 230A. Colors other than white, such as grey or beige may be used. The color, number and locations of the calibration strips is a matter of design choice. The outer surface 141 of backer 140 may also be used to calibrate first CIS scan bar 230.

Controller 212 executes program instructions stored in memory 220 to effect the scanning on media 184 or target 150 to form a digital image thereof. For example, where duplex scanning is selected, scanner 100 would have media 184 fed through ADF 170 from media input area 180 to pass between first and second CIS scan bars 230, 230A where its top and bottom surfaces are scanned as the media is fed out to media output area 190. Similarly, if multiple sheets of media were to be one-sided or simplexed scanned, the sheets of media may be placed in media input area 180 and fed through ADF 170 and past second CIS scan bar 230A or first CIS scan bar 230, depending on the design of scanner 100, and out to output media area 190. When a target 150 is placed on platen 104, controller 212 would, using scan drive motor 60, cause first CIS scan bar 230 to translate along rails 61 to scan the first surface 151 of the target 150 to form a digital image.

First and second CIS scan bars 230, 230A are shown as contact image sensor (CIS) scan bars. However, either scan bar may be an optical reduction scan bar. Second scan bar 230A may be a CIS scan bar or an optical reduction scan bar. First scan bar 230 may be an optical reduction scan bar while second scan bar 230A may be a CIS scan bar and vice versa. In other words, the first and second scan bars 230, 230A do not have to be of the same type. When first and second scan bars 230, 230A are CIS scan bars, they are constructed as previously described with respect to CIS scan bar 30 and calibrated using the present method.

As previously described, CIS scan bars 230, 230A each has an LED array 242, 242A each with LEDs 242-1-242-X and LEDs 242A-1-242-X, respectively, where X represents the last of the color types. For example, where only the red, green and blue LEDs are used, X would be 3. The LED arrays 242, 242A, in combination with respective light guides 248, 248A illuminate the scan line of the image to be scanned on media 184, target 150, respectively. The illuminated image is then captured by the plurality of photoreceptors in sensor arrays 250, 250A, respectively. Color scanning is done by illumining each color type of LED separately to illuminate the target and taking a sub-scan line for each color for each resultant scan line of the image and then combining the three sub-scan lines to form a resultant color scan line image. This is repeated for all scan lines down the length of either the original image, target 150 or media 184, to create a full two-dimensional color scan image.

CIS scan bars typically use a scan line wide light guide that distributes light from the LEDs, typically, one red, one green, and one blue LED, at one end of the light guide across the width of the scan line. The data forming the scanned digital image contains a fixed number of rows and columns comprised of pixels. Pixels are the smallest individual element in the digital image, holding quantized values that represent the brightness of a given color at any specific point. Typically, the pixels are stored in memory as a raster image or a raster map, a two-dimensional array of small integers. These values are often transmitted or stored in a compressed form. The digital images may start out in non-square arrays such as 1200×600 PPI (Pixels Per Inch) or 600×300 PPI or in square arrays such as 300×300 PPI.

As illustrated in FIG. 2, the normal method of operating first CIS scan bar 30 is shown. ASIC 14 controls the analog signaling including when to start a new scan line by sending signals S1-S2 having a pulse indicating the start of scanning for each color of light—red, green and blue and having timing generator sending signal S3 for sending the output voltage data from the sensor array 50. On the digital side AFE 32 packetizes the red, green and blue data as is well known in the art for each color scan line which is respectively stored in buffers DB1, DB2, DB3. The length in time or duration for each color of light is fixed. Typically almost all imaging ASICs have no flexibility to alter the duration of each individual color scan line time, this forces all of the LED colors to use the same scan line duration as previously described and shown in FIG. 2. The presently disclosed method in one embodiment uses a fixed scan line duration for the overall color scan line CSL. Another embodiment allows to the use of a variable length color scan line CSL. Both embodiments allow variation in the timing between the frame pulses FP in signal S3 unlike that used in prior art devices.

For purposes of description only and not limitation, when referring to the presently disclosed method, the sequencing of the color scan lines will be described as having a sequence of red, then green, then blue using red, green and blue LEDs. Other sequences and other color types of LEDs may also be used with the presently disclosed method. For example, an infrared LED and/or an ultraviolet LED may also be provided in addition to red, green and blue LEDs 242-1, 242-2, 242-3.

Figure 8A:
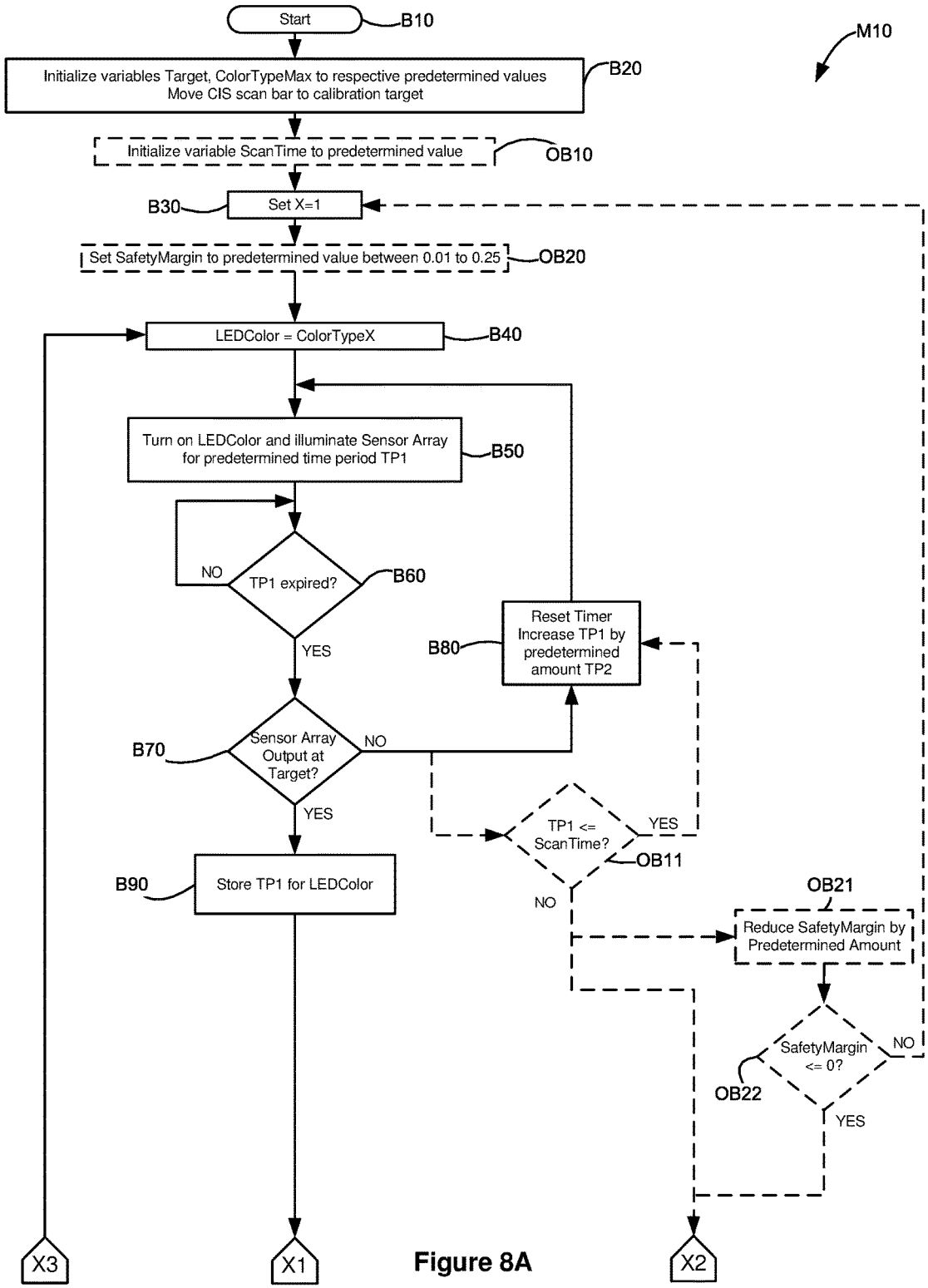
FIGS. 8A-8B illustrate a flow chart of the presently disclosed method of calibrating the CIS scan bar system of FIG. 5.
Figure 8B:
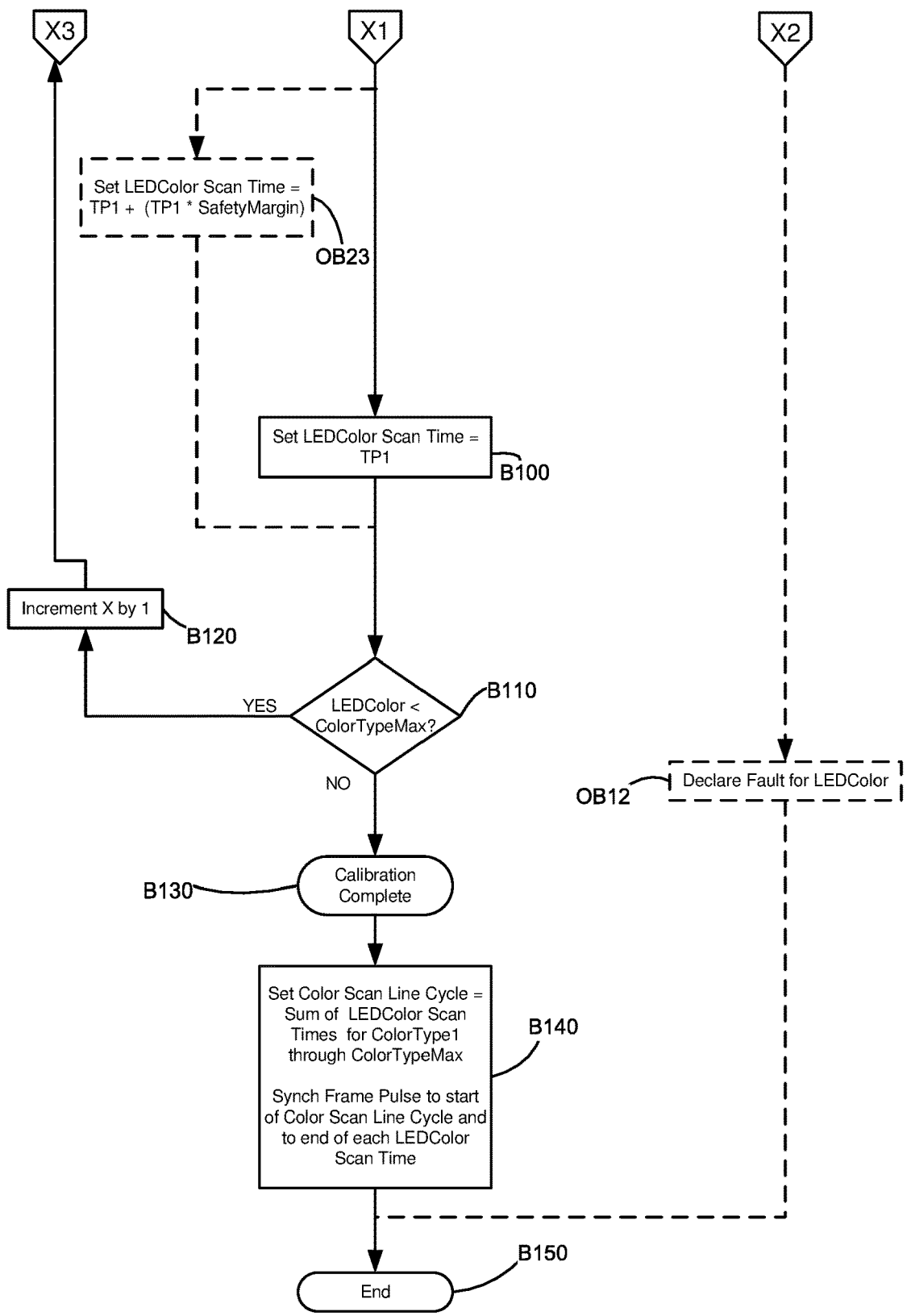

FIGS. 8A-8B describe a method M10 of the present disclosure used in a scanner to calibrate the sensor array of a CIS scan bar such as CIS scan bar 230 or CIS scan bar 230A. For purposes of description only, method M10 will be described with reference to CIS scan bar 230 only.

Method M10 starts at block B10 and proceeds to block B20 at which variables Target, ColorTypeMax are initialized to predetermined values and the CIS scan bar is moved to the calibration target 400. The variable Target represents a specific output voltage level from each photoreceptor in the sensor array 250 such as 500 mV or a specified operating range such as 475 mV to 525 mV. The voltage values are examples only. The variable ColorTypeMax represents the number of different light colors used in the scanner. Typically, three colors—red, green and blue—are used. For example, ColorType1 may be red, ColorType2 may be green, ColorType3 may be blue, and ColorType4 may be ultraviolet. Where three, four or five colors are used, ColorTypeMax would have a values of 3, 4 and 5, respectively. However, the present method is not limited to three, four or five colors. At block B30, the variable X is set to one. For purposes of description and not of limitation, the color red may be color 1 or X=1 and ColorType1 represents red, green color 2 or X=2 and ColorType2 represents green, and blue color 3 or X=3 and ColorType3 represents blue, and ColorTypeMax would be 3.

Next, at block B40, the variable LEDColor is set equal to ColorTypeX where in the initial pass ColorTypeX is set to ColorType1. Thereafter at block B50, LEDColor is turned on or illumined to illuminate the sensor array 250 for a predetermined time period TP1. This time period is empirically determined and one example value may be 40 microseconds (μs). When X=1, then the red LED 242-1 would be illumined to illuminate the sensor array 250. When X=2, the green LED 242-2 would be illumined to illuminate the sensor array 250 and when X=3, the blue LED 242-3 would be illumined to illuminate the sensor array 250.

At block B60, a determination is made whether or not the time period TP1 has elapsed. When it is determined that the time period TP1 has not expired, M10 waits and loops back to block B60. When it is determined that the time period TP1 has expired, method M10 proceeds to block B70. As is known, the tracking of the passage of the time period TP1 may be done with up or down timers or counters. The mechanism used is a matter of design choice and not limitation.

At block B70, a determination is made whether or not the output of each of the photoreceptors is at the Target. When it is determined that the outputs are not at the Target, then at block B80, the time period TP1 is increased by a predetermined second time period TP2. An example value for TP2 may be 10 μs. The time period TP2 may be stored in memory 220. The method M10, in one embodiment, then returns to block B50. When, at block B70, it is determined that the output of the sensor array is at Target, then at block B90, the time period TP1 is stored for that LEDColor. In this case, the red color. At block B100, for LEDColor a LEDcolor scan line time (SLT) is set to time period TP1. Next, at block B110, a determination is made whether or not the LEDColor is less than the variable ColorTypeMax. In other words, has each color LED in the LED array been illuminated and the output of the sensor array is at the Target.

When it is determined at block B110 that the LEDColor is less than ColorTypeMax, at block B120, X is incremented by 1 and then method M10 returns to block B40 to repeat the process for the next color of light and corresponding color LED. The looping continues until all of the different colors of light and the corresponding color LEDs have been processed.

When it is determined that the LEDColor is not less than MaxColorType, the method moves to block B130 indicating that the calibration is complete. Next at block B140, the color scan line cycle (CSLC) is set equal to the sum of the LEDColor Scan Times for ColorType1 through ColorTypeMax, which represents the time for which each LED is turned on or illumined. A frame pulse is synched to the start of the color scan line cycle and the end of each LEDColor Scan Time. Timing information for triggering each frame pulse in signal S3 is based on the LEDColor Scan Times for ColorType1 through ColorTypeMax and is stored in and retrieved from the timing register 238. In other words, the CSLC is the sum of the respective stored time period TP1 for each respective color of light of the X different colors of light, which is determined from performing the calibration method with the frame pulse triggering both the sequential illuming of each LED in the LED array 242 and synchronizing the transmission of the voltage output data from the photoreceptors back to AFE 232 and ultimately to ASIC 214. During scanning of a target, each respective color of light of the X different colors of light in the color scan line cycle is emitted for its respective stored time period TP1 and the data collected from the sensor array 250 from the previous scan time is sent back to the data buffers 222. For the red-green-blue sequence, the red data is sent when the green LED is being illuminated, the green data when the blue LED is illumined, and the blue data when the red LED is illuminated at the start of the next color scan line cycle. At block B150, method M10 ends.

Figure 9:
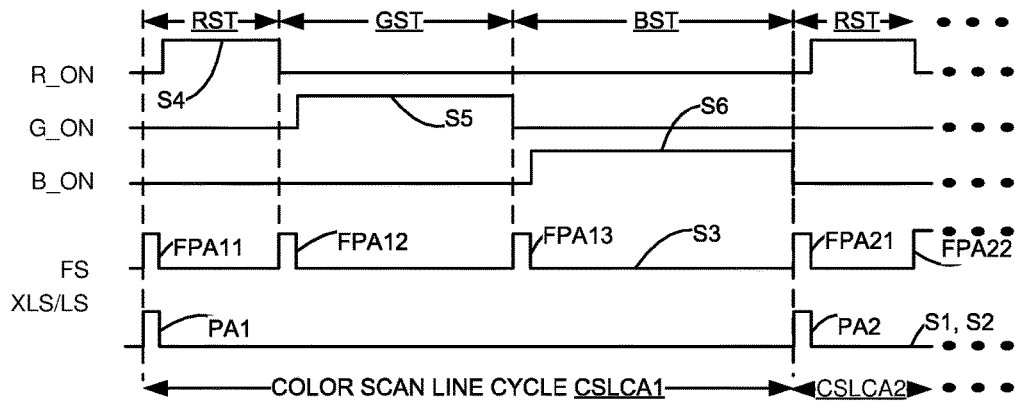
FIG. 9 is a timing diagram for the color LEDs allowing for a shortened color scan line cycle using the calibration method of FIGS. 8A-8B.

As shown in FIG. 9, the present method allows for a variable length color scan line cycle CSLCA1 which is the combination of signals S4-S6 that occurs between the synch pulses PA1, PA2 that are sent on signals S1, S2. The variation in the timing of the frame pulses FPA11, FPA12, FPA13, which is stored in the timing register 238, can be seen in signal S3 as compared to signal S3 of FIG. 2. As also shown in FIG. 9, the frame pulses may also be used to trigger the "on" portions of signals S4-S6 respectively for illumining each of the LEDs 242-1-242-3. The red scan time RST is between frame pulses FPA11 and FPA12, the green scan time GST between frame pulses FPA12 and FPA13, and the blue scan time BST between frame pulses FPA13 and FPA21 that occurs at the start of the next cycle. Frame pulses FPA21, FPA22 in the second color scan line cycle CLSCA2 are also illustrated in FIG. 9.

In FIG. 9, assume that the total amount of time to perform the color scan line cycle is represented by the variable TotalTime (TT). Assume also that the value for the Target for the output signals of each of the photoreceptors in the sensor array 250 is set at 500 mV. From performing the method M10, it is determined that the red LED 242-1 needs to be illumined for 50 μs, the green LED 242-2 for 100 μs and the blue LED 242-3 for 200 μs. Then the portion of the cycle scan cycle TT for the red LED would be 50/350 TT, 100/350 TT for the green LED and 200/350 TT for the blue LED. With the present example, the shortest color scan line cycle time would be the sum of the three individual times of 50 μs, 100 μs, and 200 μs or 350 μs whereas with the prior art embodiments requiring equal times the total color scan line time would be 600 μs. Thus, a savings of 250 μs per color scan line cycle is achieved.

Referring back to FIG. 8A, in a second embodiment, the method M10 includes initializing a variable ScanTime to a predetermined value as shown in optional block OB10 prior to block B30. Optional block 10 may also be incorporated into block B20. Each color scan time will have a total time value equal to the value of the variable ScanTime. The method M10 proceeds through blocks B50, B60, B70, B90, B100, B110, B120, B130, B140, B150 as previously described, except that at block B70 when it is determined that the sensor array 250 output is not at the Target, method M10 proceeds to optional block OB11 where a determination is made whether or not the time period TP1 is less than or equal to the ScanTime. When a positive determination is made, method M10 proceeds back to blocks B80, B50 etc. When a negative determination is made, method M10 proceeds to optional block OB12 at which a fault is declared. This would mean that the LED for the color being calibrated has not reached the Target within the allotted time indicating that there is a problem with that LED. Thereafter, the method M10 proceeds to block B150 and ends.

Another embodiment that concatenates with the second embodiment is illustrated with optional blocks OB20-OB22. At optional block OB20, method M10 further includes setting a variable SafetyMargin which is a predetermined multiplier of about 0.01 to about 0.25 that is used to increase the "on" times of each LED by about 1 to about 25 percent. Optional block OB20 occurs immediately subsequent to block B30. The use of a safety margin allows for variability of the CIS scan bar as the LED array 242 and sensor array 250 age. Method M10 proceeds as previously described. However at optional block OB11 after it is determined that the time period TP1 is not less than or equal to the variable ScanTime, method M10 proceeds to optional block OB21. where the variable SafetyMargin is reduced by a predetermined amount or percentage. The amount of decrease is empirically determined. Example decreases may be in the range of about 1 to about 25 percent per iteration. Thereafter, at optional block OB22, a determination is made whether or not the variable SafetyMargin is less than or equal to zero. When it is determined that the variable SafetyMargin is less than or equal to zero, method M10 proceeds to optional block OB12 where a fault is declared as previously described and then on to block B150 to end. When it is determined that the variable SafetyMargin is greater than zero, method M10 proceeds back to block B30 where the calibration method M10 is restarted using the reduced value for the variable SafetyMargin. The calibration method is restarted from the beginning so that all of the LEDs use the same value for the SafetyMargin variable.

In yet another embodiment, subsequent to block B90, at optional block OB23, the LEDcolor Scan Time is set equal to the time period TP1 plus a value that is the time period TP1 multiplied by the variable SafetyMargin (LEDcolor Scan Time=TP1+(TP1*SafetyMargin). This step provides a proportional increase in each of the LEDColor scan times. This accommodates aging of the LED array 242 and/or the sensor array 250. Optional block OB23 would be performed in lieu of block B100.

Figure 10:
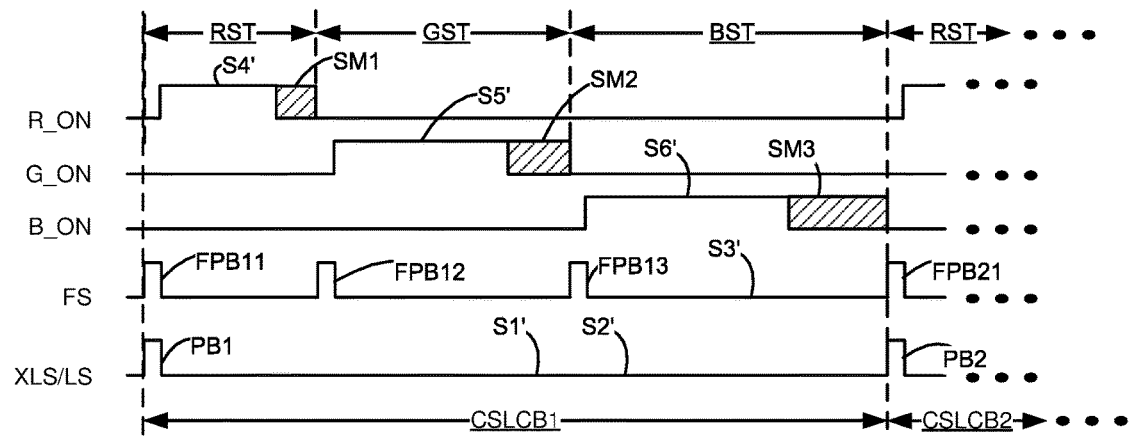
FIG. 10 is a timing diagram for the color LEDs in a color scan line cycle allowing for variability in the LED output over life using an alternate form of the calibration method of FIGS. 8A-8B.

FIG. 10 illustrates color scan line cycle CSLCB1, where the proportional increase in the red scan time RST, green scan time GST, and blue BST of signals S4'-S6' is provided using the variable SafetyMargin as indicated by the lined areas SM1, SM2, SM3, respectively, which respectively proportionally extends the "on" times for each respective color LED found in the LED array 242. The red scan time RST is between frame pulses FPB11 and FPB12, the green scan time GST between frame pulses FPB12 and FPB13, and the blue scan time BST between frame pulses FPB13 and FPB21 that occurs at the start of the next color scan line cycle CLSCB2. In FIG. 10, signals S1'-S3' are substantially identical to signals S1-S3 previously described in FIG. 9.

Using the previous example where the respective illuminating times for the red, green and blue LEDs are 50 μs, 100 μs and 200 μs, respectively, and applying a fifteen percent safety margin (a multiplier of 0.15), the illumining times for the red, green and blue LEDs would be 58 μs, 115 μs and 230 μs, respectively. Using the prior art approach, the total color scan line cycle would be 3*230 μs or 690 μs. Using method M10 and the same safety margin, the total color scan line cycle would be 403 μs or a potential speed increase of forty-one percent without loss of signal quality.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

What is claimed is:

1. In a scanner having a CIS scan bar having an LED array for emitting N different colors of light where N≥3 and a sensor array having a plurality of photoreceptors, a method of calibrating a response of the sensor array, the method comprising:

illumining the LED array to emit a first color of light of the N different colors of light and illuminating the sensor array with the first color of light for a predetermined time period TP1;

on the expiration of the time period TP1, determining whether or not a voltage of an output signal of each photoreceptor is equal to or greater than a predetermined target value of said voltage;

upon determining that the output signal of said each photoreceptor is said equal to or greater than the predetermined target value, storing the time period TP1;

else, upon determining that the output signal of each photoreceptor is less than the predetermined target value, iteratively illuminating again the LED array to emit the first color of light for a time longer than the predetermined time period TP1 until the voltage of the output signal of said each photoreceptor is said equal to or greater than the predetermined target value and storing the time;

repeating the foregoing for each remaining color of light of the N different colors of light and storing the respective time period TP1 or the respective time longer than the predetermined time period TP1 for said each remaining color of light; and creating a color scan line cycle that sums the stored time period TP1 or said time for each respective color of light of the N different colors of light wherein, during scanning of an image, in the color scan line cycle, said each respective color of light of the N different colors of light is emitted for the stored time period TP1 or said stored time.

2. The method of claim 1, further including adding a safety margin time to the color scan line cycle in an amount of about 0.01 to about 0.25 of the stored time period TP1 or said stored time.

3. The method of claim 1, wherein the N different colors of light are red, green, and blue.

4. The method of claim 3, wherein the LED array comprises a red LED, a green LED and a blue LED.

5. The method of claim 1, wherein the N different colors of light are red, green, blue, and one of ultraviolet and infrared.

6. The method of claim 5, wherein the LED array comprises a red LED, a green LED, a blue LED and one of an ultraviolet LED and an infrared LED.

7. In a scanner having a CIS scan bar having an LED array for emitting N different colors of light where N≥3 and a sensor array having a plurality of photoreceptors, a method of calibration, comprising:

for each color of the N different colors of light, illumining the LED array to illuminate the sensor array for a time until each of the photoconductors of the sensor array provides an output signal indicating a voltage that is equal to or greater than a predetermined target value of voltage;

summing together the time corresponding to said each color; and during scanning of an image, illumining the LED array for a period of time corresponding to the summed together said time.

8. The method of claim 7, further including adding time to the summed together said time in an amount of 0.01 to about 0.25 of the summed together said time.

* * * * *